June 29, 1943.　　　J. V. O. PALM ET AL　　　2,322,771
BEARING
Original Filed Jan. 27, 1938

INVENTORS.
JOHN V. O. PALM
JOHN K. ANTHONY
JOHN E. WILKEY
BY
ATTORNEYS.

Patented June 29, 1943

2,322,771

UNITED STATES PATENT OFFICE 2,322,771

BEARING

John V. O. Palm, Cleveland Heights, John K. Anthony, Cleveland, and John E. Wilkey, South Euclid, Ohio, assignors to The Cleveland Graphite Bronze Company, Cleveland, Ohio, a corporation of Ohio Continuation of application Serial No. 187,204, January 27, 1938. This application February 7, 1940, Serial No. 317,738

8 Claims. (Cl. 308—238)

The present invention, relating as indicated, to bearings, is more particularly directed to a new and improved bearing having a materially increased resistance to fatigue, load capacity and life. A further object of the invention is the provision of a bearing having the above characteristics which shall be relatively economical to manufacture.

To the accomplishment of the foregoing and related ends, said invention, then, consists of the means hereinafter fully described and particularly pointed out in the claims; the annexed drawing and the following description setting forth in detail certain structure embodying the invention, such disclosed means constituting, however, but one of various forms in which the principle of the invention may be used.

Figure 1:
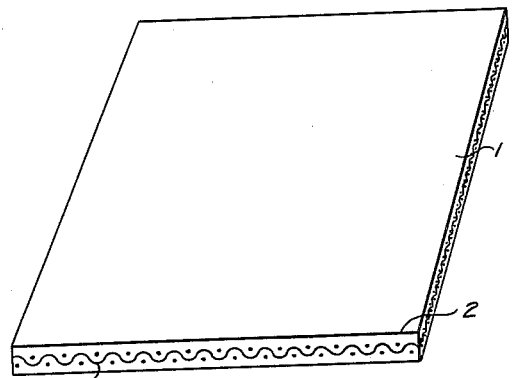
Fig. 1 is a view in perspective of one form of our improved bearing.

Bearings now commonly in use for heavy duty, such for example as the journaling of a crankshaft or connecting rods in an internal combustion engine, are formed of a layer of bearing material bonded to a reinforcing support, the composite structure being inserted in the housing. Materials used for the bearing facing include various types of babbitt and also such materials as lead bronze. In internal combustion engines it has been found that the mean unit pressure on babbitt bearings should not exceed 1500 pounds per square inch if a satisfactory life of the bearing is to be secured. This does not necessarily mean that a higher load will cause immediate destruction of the bearing, but a safe working load to secure a relatively long life for the bearing is that given above. A lead bronze composition has a capacity of approximately 2000–2200 pounds per square inch but is materially harder than the babbitts and hence more likely to injure the shaft journaled therein. None of these materials is entirely satisfactory for the severe service which is now found in airplane motors, trucks, tractors, high-speed Diesel engines and even in many cases in engines for use in passenger vehicles. A great amount of work has been done in the past few years in an attempt to find an alloy or a material which would carry heavier loads without injuring the shaft and without destruction due to earlier fatigue.

The materials which are available are of course greatly limited by the requirements of the service of the bearing. The material must not be unduly impaired by heat up to the working temperatures of bearings in severe service. With the proper lubricant this temperature is above 250° F. This temperature is that determined at the back of the bearing by a thermocouple. Obviously the temperatures on the operating surface of the bearing may be higher, and if there are any high spots, the temperature at this point may be very considerably higher than the general working temperature of the bearing. The material must naturally be resistant to solubility in oil and resistant to deformation or softening at the elevated operating temperatures and should also be resistant to solubility in water, acids and alkalies. In addition to these properties, a bearing material should have considerable strength both in tension and in shear to resist the stresses imposed upon it in service to enable it to resist fatigue.

The capacity and life of a bearing are determined by its general strength and by its resistance to fatigue. It has been attempted many times to combine into a single bearing or bearing material two different materials, one of which has high fatigue resistance and the other of which has general strength in order to secure a composite bearing material or composition which would have the necessary requirements for heavy duty. For example, such materials as resins which have a low tensile strength but a high resistance to fatigue, by the introduction of organic reinforcing materials, such for example as canvas and the like, to increase the general all-around strength of the material. These attempts have been uniformly unsuccessful and no combination has been found which at forming and operating temperatures has the high fatigue resistance and strength required at the elevated temperatures and high pressure encountered.

We have found a composite material, however, which possesses high general strength, great resistance to fatigue and capacity to resist repeated alternating strains and high unit bearing pressures. Our composite material has been found capable of withstanding unit pressures of from 50% to 100% more than any of the bearings now used for the most severe service. At the same time, our new bearing material is capable of being easily processed and is relatively inexpensive to manufacture.

Our new bearing material consists of resinoid which possesses inherent high resistance to fatigue, reinforced by glass cloth, an inorganic non-metallic fibrous material of high tensile strength, with the result that the composite material thus produced has high fatigue resistance, high unit pressure capacity and very considerable tensile strength.

The term "resinoid" as employed above is intended to include, among others, such plastic and deformable materials as natural and synthetic resins, including as examples only, phenol and urea resins and similar materials which can be formed into a molded article of the desired shape by the application of heat and pressure and which, when so formed, resists deformation, decomposition or disintegration at temperatures such as are met with in bearing service, that is, between 200° and 350° F.

Referring now to the drawing, we have shown in Fig. 1 a bearing consisting of a flat plate-like member 1 of a resinoid material 2, within which is substantially centrally embedded a fabric-like material 3 of glass cloth or fibres.

Figure 2:
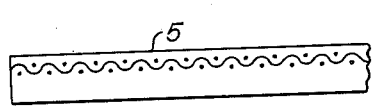
Figs. 2 and 3 are partial side views of other forms of our bearing.
Figure 3:
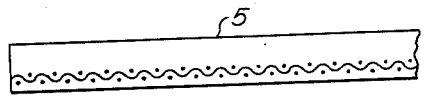
Figure 4:
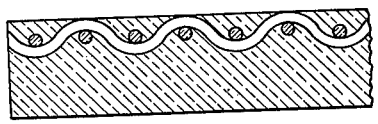
Fig. 4 is a partial transverse section through one form of our bearing.

The position of the glass cloth material in the bearing material proper may depend upon various conditions, and the glass cloth material may be placed either close to the upper or bearing surface 5 of the bearing, as shown in Fig. 2, or close to the lower surface thereof, as shown in Fig. 3, or it may be placed centrally as already indicated in Fig. 1. If desired, the reinforcing fabric may be so mounted in the bearing material that the intersections of the fabric actually enter the bearing surface, that is, they project into this surface. Reinforcing fabric, when mounted to intersect the surface of the bearing, is of course contacted by the lubricant and the latter is held and restrained by capillary adsorption in the fibres. In this way the bearing is provided with a reservoir of oil which is given off briefly before the start or during the failure of the lubrication.

Figure 5:
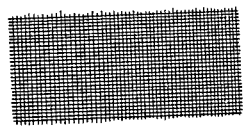
Figs. 5 and 7 are plan views of reinforcing material employed in our bearing.
Figure 6:
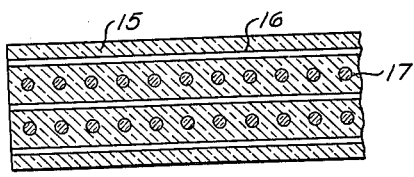
Fig. 6 is a partial transverse section of one form of our improved bearings showing a different arrangement of reinforcing material from that shown in Fig. 4.
Figure 7:
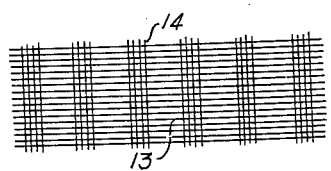

Types of glass fibre material which may be used are shown in Figs. 5 and 7. In Fig. 5 a regular rectangular woven fabric is shown. In Fig. 7 are shown a series of parallel fibres 13 connected by interwoven bands 14 of transverse fibres, the bands being spaced somewhat from each other, and it will be readily understood that many variations of the weave here shown may be employed. In Fig. 6 we have shown a partial section of a bearing consisting of a resinoid 15 in which are disposed a series of generally parallel strands of glass fibre 16 and other strands 17, also arranged in more or less parallel relation extending in a direction angularly to the first-named strands 16. Either two or more angularly related layers of fibres may be used as shown in this figure. It is not necessary to have the reinforcement consisting of woven fibres or even of connected fibres, provided that there is substantially continuous reinforcement of the bearing material throughout its area. This latter condition can be secured either by the insertion of woven glass fabric or by the insertion of continuous reinforcing in the form of separate strands of glass fibres which may even be relatively short in individual length, provided that they overlap and give a continuous reinforcement to the bearing member. The resinoid bearing material must have continuous reinforcing all over the stressed area, but by the term "continuous" we do not mean to imply that individual fibres or fabrics employed must be continuous. For example, it is possible to mat together separate fibres of the type described, compress these and then embed this compressed matter reinforcing material in the resinoid. In such a construction the fibres do not even contact each other to any appreciable extent as the natural resiliency of the fibre would tend to spring them apart after the pressure necessary to mat them together was removed, but still there would be a continuity of reinforcement from such matted structure within the bearing.

It will of course be understood that our improved bearing may be used for various services and in various forms, both flat and otherwise as may be required, and that if the service requires, it may of course be supported or reinforced by additional members suitably secured thereto.

Ordinary babbitts applied to a thickness of .020 to .030 of an inch to a reinforcing steel shall be capable of sustaining mean unit pressures of 1500 to 1800 pounds. Our improved bearing has been found to sustain 100% more load under the same conditions. This result we believe to be due to the increased strength given to the bearing material by the reinforcing material.

This application is a continuation of our co-pending application, Serial No. 187,204, filed January 27, 1938.

Other modes of applying the principle of our invention may be employed instead of the one explained, change being made as regards the structure herein disclosed, provided the means stated by any of the following claims or the equivalent of such stated means be employed.

We therefore particularly point out and distinctly claim as our invention:

1. A bearing for rotary shafts comprising an element consisting of a resinoid having reinforcing embedded therein in position to reinforce the same against mechanical strains, said reinforcing being substantially continuous throughout the area of the bearing and composed of glass fibres.

2. A bearing for rotary shafts comprising an element consisting of a resinoid having reinforcing embedded therein in a position to reinforce the same against mechanical strain, said reinforcing being substantially continuous throughout the area of the bearing and composed of glass fibres arranged in a plane substantially parallel with the operating surface of the bearing.

3. A bearing for rotary shafts comprising an element consisting of a resinoid having a strip of fabric-like material formed of glass fibres embedded therein.

4. A bearing for rotary shafts for use at temperatures in excess of 250° F. comprising an element consisting of a resinoid having a strip composed of glass fibres embedded therein in position to reinforce the same against mechanical strains.

5. A bearing for rotary shafts comprising an element consisting of a resinoid having a strip composed of glass fibres embedded therein in position to reinforce the same against tension strains, said material extending into the operating surface of said element and having sufficient tensile strength to reinforce said resinoid.

6. A bearing for rotary shafts comprising an element consisting of a resinoid having reinforcing embedded therein, said reinforcing being continuous substantially throughout the area of the bearing surface and consisting of fibres of glass, said fibres being maintained in transversely spaced relation by means of fibres of a similar material arranged transversely to said first-named fibres.

7. A bearing for rotary shafts comprising an element consisting of a resinoid having reinforcing embedded therein, said reinforcing comprising fibres of glass, arranged in a plane substantially parallel with the operating surface of the bearing and oriented in the general direction of intended movement of the surface of the body which said bearing surface is adapted to support.

8. A bearing for rotary shafts comprising an element consisting of a resinoid having reinforcing embedded therein, said reinforcing comprising fibres of glass, arranged in a plane substantially parallel with the operating surface of the bearing and oriented in the general direction of intended movement of the surface of the body which said bearing surface is adapted to support, said fibres being maintained in transversely spaced relation by means of fibres of a similar material oriented in a direction transverse to said first-named direction of orientation.

JOHN V. O. PALM.
JOHN K. ANTHONY.
JOHN E. WILKEY.